United States Patent [19]

Nakamura et al.

[11] Patent Number: 5,572,681
[45] Date of Patent: Nov. 5, 1996

[54] SPEECH CODEC AND A METHOD OF PROCESSING A SPEECH SIGNAL WITH SPEECH CODEC

[75] Inventors: Makio Nakamura; Akira Hioki, both of Tokyo, Japan

[73] Assignee: NEC Corporation, Tokyo, Japan

[21] Appl. No.: 106,562

[22] Filed: Aug. 16, 1993

[30] Foreign Application Priority Data

Aug. 24, 1992 [JP] Japan .................. 4-247273

[51] Int. Cl.⁶ .................................. G10L 3/02
[52] U.S. Cl. ................ 395/2.21; 395/2.2; 395/2.1
[58] Field of Search ............. 395/2, 2.1, 2.21, 395/2.2; 370/58.1, 112

[56] References Cited

U.S. PATENT DOCUMENTS 4,713,776  12/1987  Araseki ........................ 395/2.38
4,845,752  7/1989  Blanc et al. .................... 395/2.1

FOREIGN PATENT DOCUMENTS 0496589  7/1992  European Pat. Off. .

OTHER PUBLICATIONS

"Very High Speed Communication Controller/PBX Concentrator", IBM Technical Disclosure Bulletin, vol. 29, No. 8, pp. 3577–3579 (Jan. 1987).

Primary Examiner—David D. Knepper
Assistant Examiner—Thomas J. Onka
Attorney, Agent, or Firm—Foley & Lardner

[57] ABSTRACT

One frame of speech signal data and subframes of speech signal data divided from the frame of speech signal data are encoded by frame and subframe encoding processes while another frame is decoded by frame and subframe decoding processes. The frame and subframe encoding processes and the frame and subframe decoding processes are interleaved to reduce the DSP memory capacity needed for a speech codec.

1 Claim, 8 Drawing Sheets

SPEECH CODEC AND A METHOD OF PROCESSING A SPEECH SIGNAL WITH SPEECH CODEC

BACKGROUND OF THE INVENTION

1. Field of the Invention

The present invention relates to a speech codec and a method of processing a speech signal with a speech codec.

2. Description of the Prior Art

Speech codecs are usually implemented by digital signal processors (DSP). Since it has been difficult for a single DSP to both encode an analog speech signal and decode a digital speech signal, it has heretofore been customary to employ a plurality of codecs to implement a speech codec.

One conventional process of processing a speech signal with a speech codec will be described below. It is assumed in the conventional process that one frame is composed of four subframes and comprises 160 samples.

Figure 1:
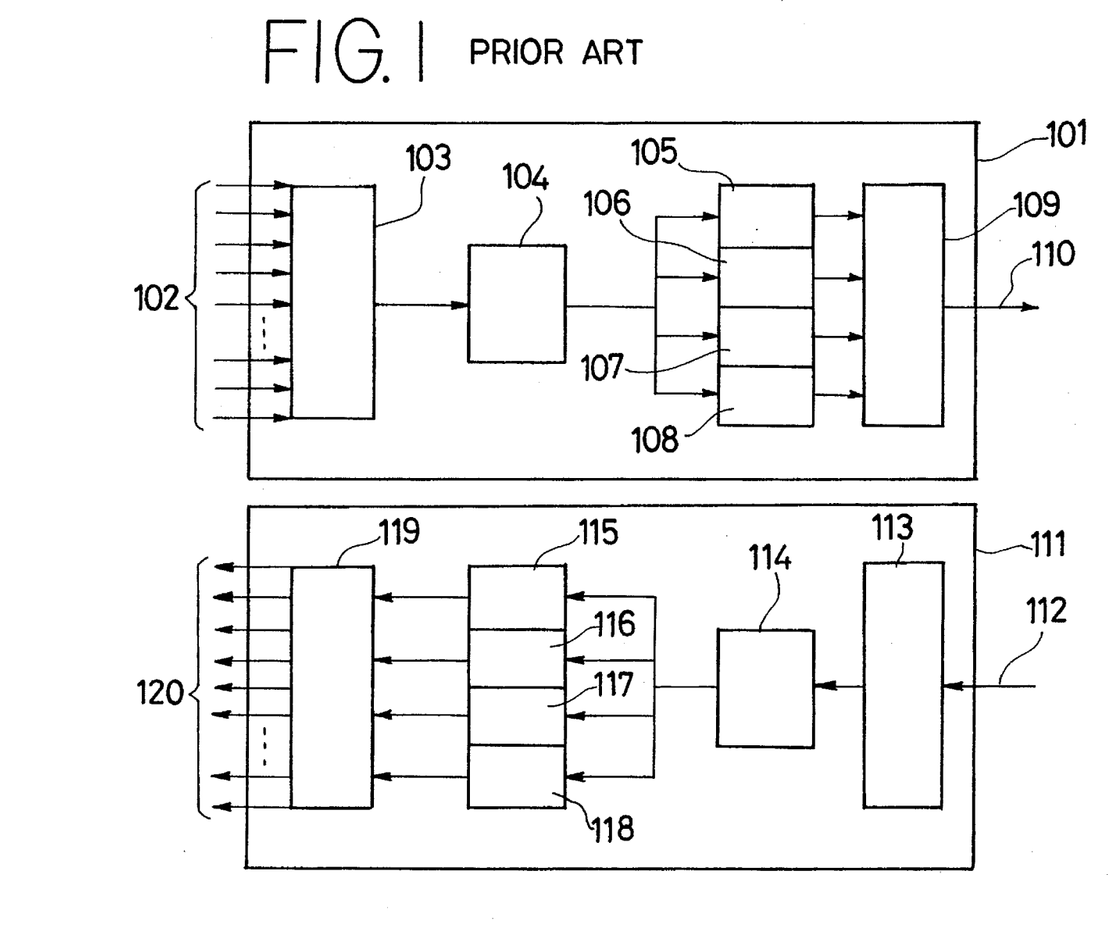
FIG. 1 is a block diagram of a conventional speech codec composed of two DSP chips.
Figure 2:
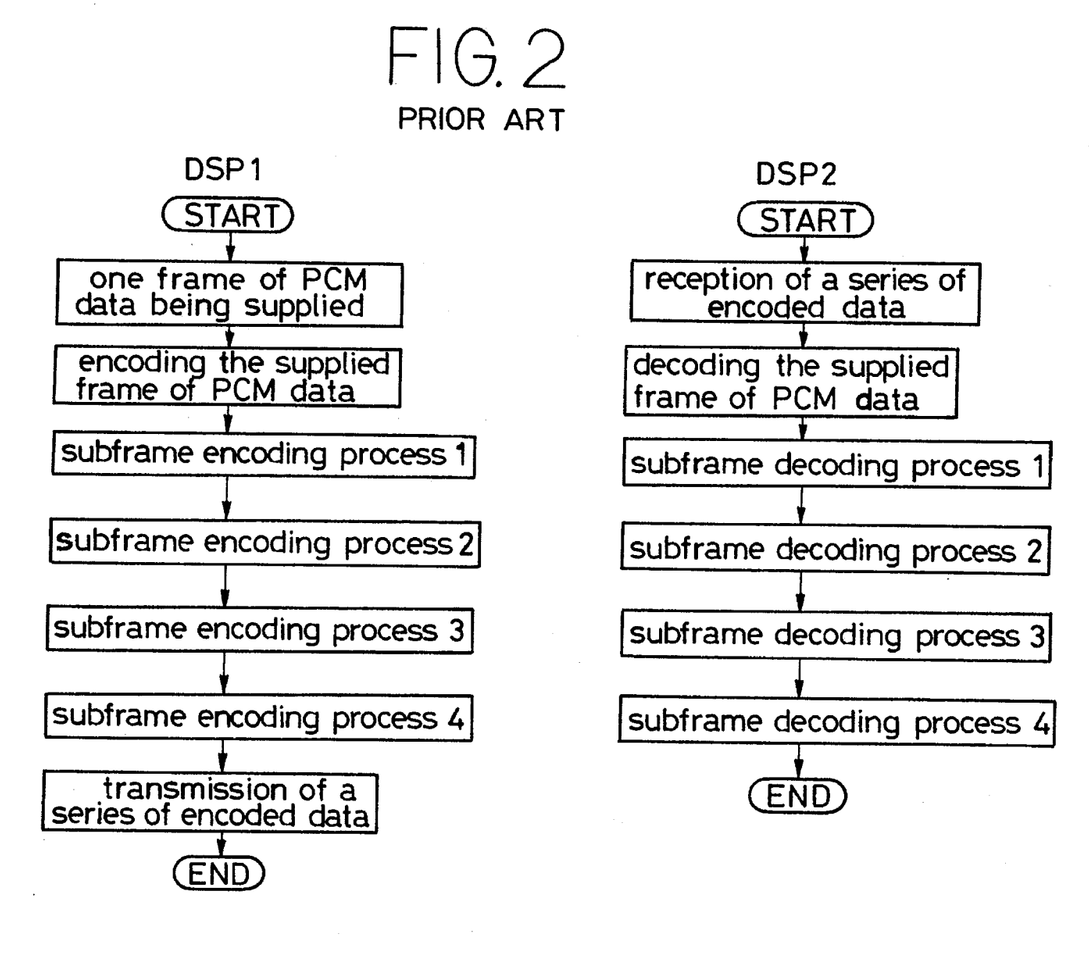
FIG. 2 is a flowchart of a processing sequence of the speech codec shown in FIG. 1.

FIG. 1 of the accompanying drawings shows in block form a conventional speech codec composed of two DSP chips. FIG. 2 of the accompanying drawings shows a processing sequence of the speech codec shown in FIG. 1. A flow of signals in the speech codec will be described below with reference to FIGS. 1 and 2.

A DSP 1 has an encoder 101 for exclusively encoding a speech signal. The encoder 101 is supplied with PCM (pulse code modulated) data 102 at predetermined sampling intervals. The supplied PCM data 102 are stored in a PCM data input buffer 103. When an encoding process is started, one frame of PCM data is supplied from the PCM data input buffer 103 to a frame encoding processor 104, which encodes the supplied frame of PCM data.

Then, the PCM data from the frame encoding processor 104 are subjected to a subframe encoding process 1 by a subframe encoding processor 105 which outputs a series of encoded data to an encoded data series transmission buffer 109. Similarly, the PCM data from the frame encoding processor 104 are also subjected to subframe encoding subframe processes 2, 3, 4 by respective sub-frame encoding processors 106, 107, 108 which output respective series of encoded data to the encoded data series transmission buffer 109. Upon completion of all the subframe encoding processes, the encoded data series transmission buffer 109 transmits a series 110 of encoded data.

A DSP 2 has a decoder 111 for exclusively decoding encoded data. When a decoding process is started, the decoder 111 receives a series 112 of encoded data. The received series 112 of encoded data is supplied to an encoded data series reception buffer 113 which outputs the series 112 of encoded data to a frame decoding processor 114. The frame decoding processor 114 effects frame decoding processing of the supplied encoded data. Then, the encoded data from the frame decoding processor 114 are subjected to a subframe decoding process 1 by a subframe decoding processor 115 which outputs decoded PCM data 120 to a decoded PCM data output buffer 119. Likewise, the encoded data from the frame decoding processor 114 are also subjected to subframe decoding processes 2, 3, 4 by respective subframe decoding processors 116, 117, 118 which output decoded PCM data 120 to the decoded PCM data output buffer 119. The decoded PCM data output buffer 119 outputs the decoded PCM data 120 at certain sampling intervals.

Figure 3:
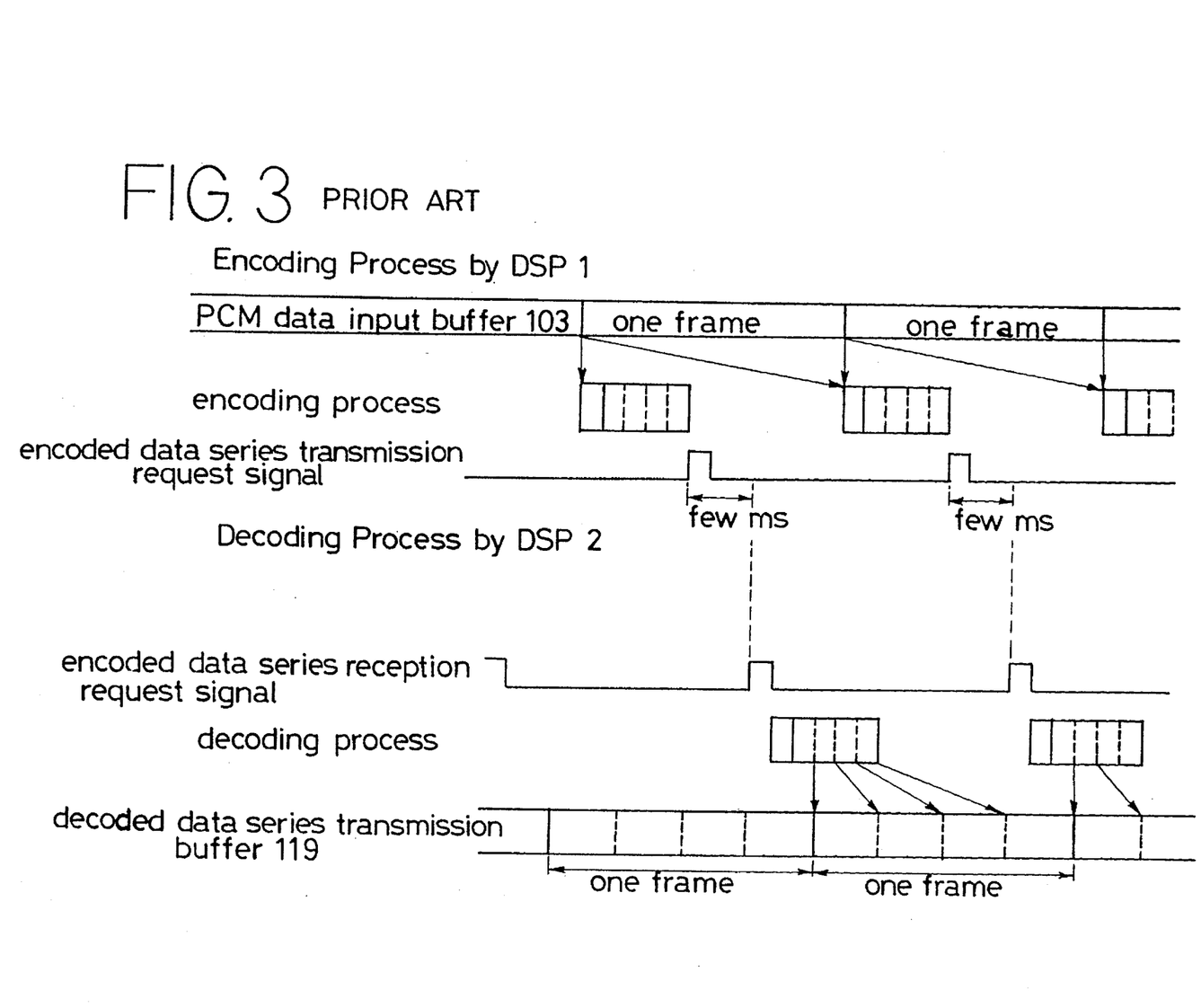
FIG. 3 is a timing chart of the processing sequence of the speech codec shown in FIG. 1.

FIG. 3 of the accompanying drawings illustrates a processing timing sequence of the conventional speech codec with two DSP chips. It is assumed that a storage buffer capable of storing one subframe of PCM data is referred to as a storage area. According to the conventional process using the speech codec, the buffers for inputting and outputting PCM data are required to have four storage areas for DSP 1 and four storage areas for DSP 2, and hence at least a total of eight storage areas. Ideally, encoding and decoding processes should be carried out with such timing that the encoding process is started at the same time that the storage of one frame of PCM data in an input buffer is completed, and in the decoding process decoded PCM data produced by the first subframe decoding process are outputted to an output buffer at the same time that the outputting of one frame of decoded PCM data is completed.

Actually, in view of timing shifts or errors of the encoding and decoding processes, the input buffer used in the encoding process is required to have (4+α) storage areas and the output buffer used in the decoding process is also required to have (4+α) storage areas.

For mobile communication networks, there is a provision stipulating that a series of encoded data transmitted from an encoder should be received by a decoder within a time period of several milliseconds, e.g., 5.75 milliseconds for a unified European digital automobile telephone from the start of transmission from the encoder. This provision can be satisfied by the conventional speed codec with two DSP chips because the two DSP chips can operate fully independently of each other.

Improved DSP performance allows a single DSP chip to both encode and decode speech signals in a speech codec. If the above provision regarding the time period between the start of transmission from the encoder and the start of reception by the decoder is to be met, the conventional processing method in which the encoding and decoding processes are executed independently of each other is required to start the encoding process before the decoding process is finished.

If the encoding process is to be carried out by an interrupt routine, control cannot return to the decoding process unless the encoding process in the interrupt routine is ended. Therefore, the outputting of decoded PCM data produced by the decoding process is delayed, preventing synthesized voice sounds from being outputted normally.

SUMMARY OF THE INVENTION

It is an object of the present invention to provide a speech codec for encoding and decoding a speech signal with a single DSP chip.

Another object of the present invention is to provide a method of processing a speech signal with such a speech codec.

According to the present invention, there is provided a speech codec for encoding and decoding speech signal data that comprises frame encoding means for encoding one frame of speech signal data at a time, a plurality of subframe encoding means for encoding subframes of speech signal data divided from the encoded frame of speech signal data, frame decoding means for decoding one frame of encoded speech signal data at a time, and a plurality of subframe decoding means for decoding subframes of speech signal data divided from the decoded frame of speech signal data.

According to the present invention, there is also provided a method of encoding and decoding speech signal data that comprises the steps of decoding one frame of received encoded speech signal data at a time, successively decoding two subframes of received speech signal data divided from the decoded frame of received encoded speech signal data, encoding one frame of received speech signal data at a time, successively encoding two subframes of received speech signal data divided from the encoded frame of received speech signal data, decoding one subframe of received speech signal data divided from the decoded frame of received encoded speech signal data, encoding one subframe of received speech signal data divided from the encoded frame of received speech signal data, decoding one subframe of received speech signal data divided from the decoded frame of received encoded speech signal data, thus completing decoding of the subframes of received encoded speech signal data contained in the one frame, and encoding one subframe of received speech signal data divided from the encoded frame of received speech signal data, thus completing encoding of the subframes of received speech signal data contained in the one frame.

The above objects and features as well as other advantages of the present invention will become more apparent from the following description of the preferred embodiment in conjunction with the accompanying drawings.

DETAILED DESCRIPTION OF THE PREFERRED EMBODIMENT

Figure 4:
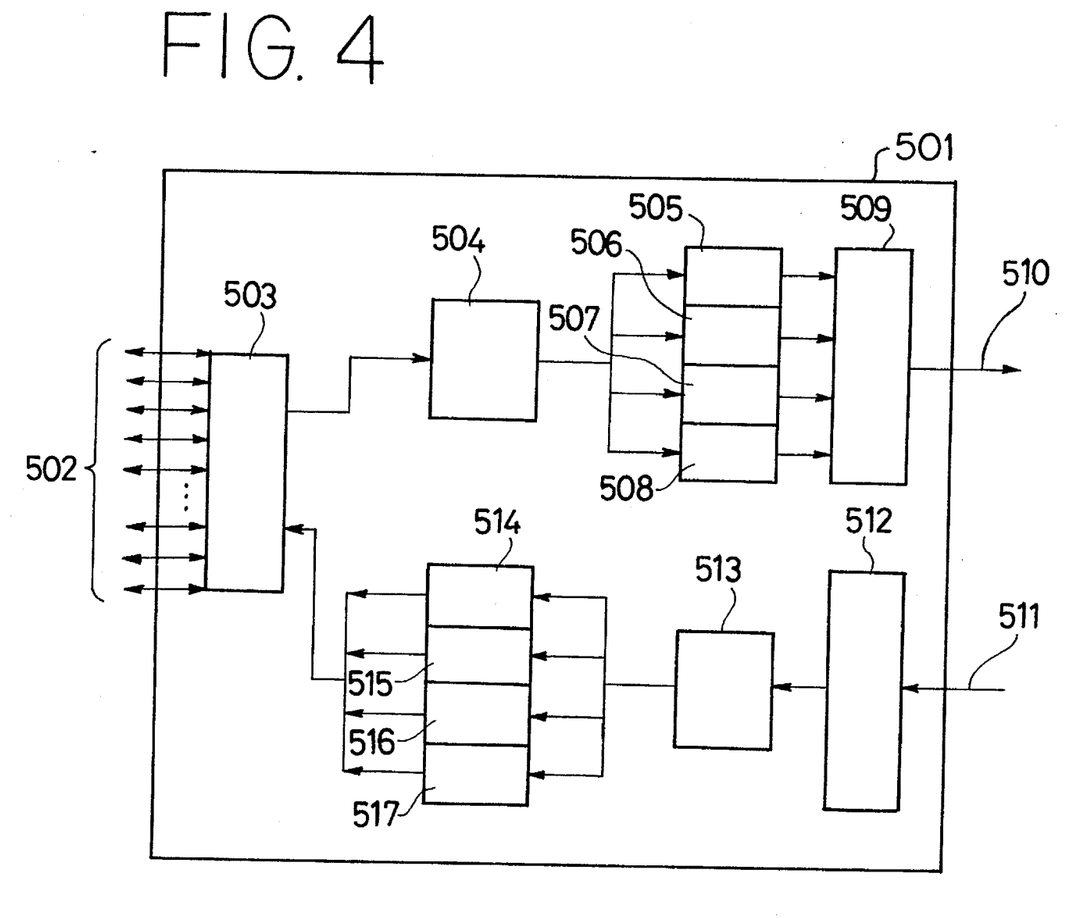
FIG. 4 is a block diagram of a speech codec composed of a single DSP chip according to the present invention.

As shown in FIG. 4, a speech codec according to the present invention comprises a single DSP chip having a single encoder/decoder 501 for encoding and decoding a speech signal. A flow of signals in the speech code shown in FIG. 4 will be described below with reference to FIGS. 4 and 6.

Figure 6:
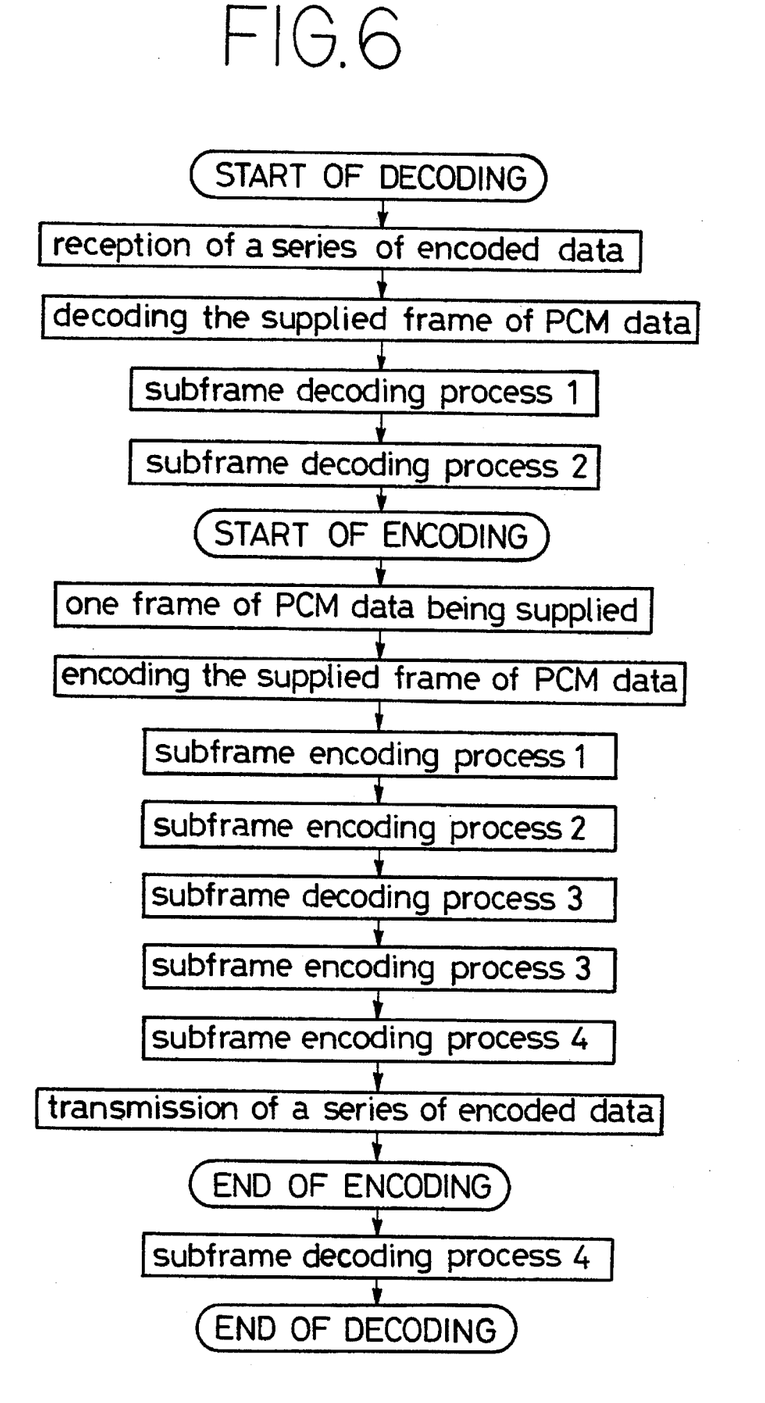
FIG. 6 is a flowchart of a processing sequence of the speech codec shown in FIG. 4.

When a decoding process is started, the speech codec receives a series 511 of encoded data which is supplied to an encoded data series reception buffer 512. The received series 511 of encoded data is then subjected to a frame decoding process by a frame decoding processor 513.

The encoded data are then supplied from the frame decoding processor 513 to a subframe decoding processor 514 which effects a subframe decoding process 1 on the encoded data. The subframe decoding processor 514 outputs decoded PCM data 502 to a PCM data input/output buffer 503. Similarly, a subframe decoding processor 515 effects s subframe decoding process 2 on the encoded data and outputs decoded PCM data 502 to the PCM data input/output buffer 503.

When an encoding process is started, one frame of PCM data 502 which have been supplied to the PCM data input/output buffer 503 at certain sampling intervals and stored therein is supplied to a frame encoding processor 504 which effects a frame encoding process on the supplied frame of PCM data.

The PCM data from the frame encoding processor 504 are then supplied to a subframe encoding processor 505 which effects a subframe encoding process 1 on the supplied PCM data. The subframe encoding processor 505 outputs a series of encoded data to an encoded data series transmission buffer 509. Similarly, the PCM data from the frame encoding processor 504 are supplied to a subframe encoding processor 506 which effects a subframe encoding process 2 on the supplied PCM data. The subframe encoding processor 506 outputs a series of encoded data to the encoded data series transmission buffer 509.

Thereafter, the encoded data are supplied from the frame decoding processor 513 to a subframe decoding processor 516 which effects a subframe decoding process 3 on the encoded data. The subframe decoding processor 516 outputs decoded PCM data 502 to the PCM data input/output buffer 503.

The PCM data from the frame encoding processor 504 are supplied to a subframe encoding processor 507 which effects a subframe encoding process 3 on the supplied PCM data. The subframe encoding processor 507 outputs a series of encoded data to the encoded data series transmission buffer 509. Similarly, the PCM data from the frame encoding processor 504 are supplied to a subframe encoding processor 508 which effects a subframe encoding process 4 on the supplied PCM data. The subframe encoding processor 508 outputs a series of encoded data to the encoded data series transmission buffer 509. The encoding process is brought to an end when the series of encoded data are outputted from the encoded data series transmission buffer 509.

Finally, a subframe decoding processor 517 effects a subframe decoding process 4 on the encoded data and outputs decoded PCM data 502 to the PCM data input/output buffer 503.

Figure 5:
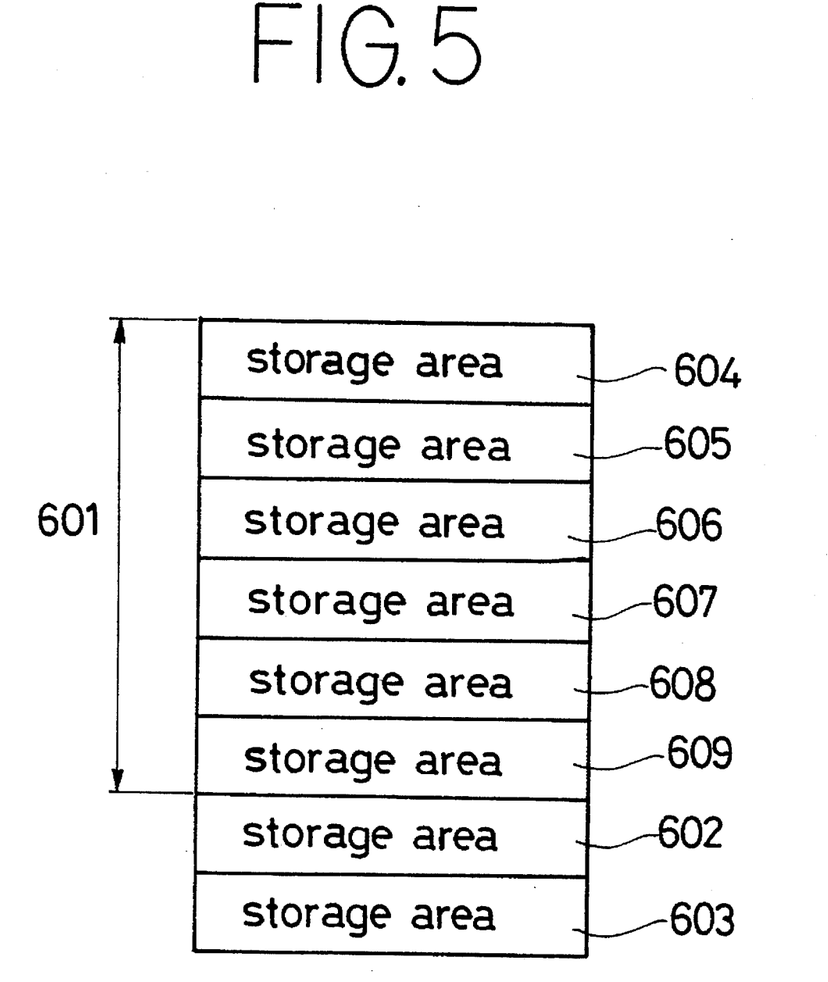
FIG. 5 is a diagram showing a DSP memory map for use in the speech codec shown in FIG. 4.

As shown in FIG. 5, a DSP memory in the encoder/decoder 501 has storage areas 604 through 609 in a PCM input/output buffer 601 (240 words) which are assigned to the PCM data input/output buffer 503 for storing subframes of data, each of 40 words, and storage areas 602, 603 which are assigned respectively to the encoded data series transmission buffer 509 and the encoded data series reception buffer 512.

Figure 7:
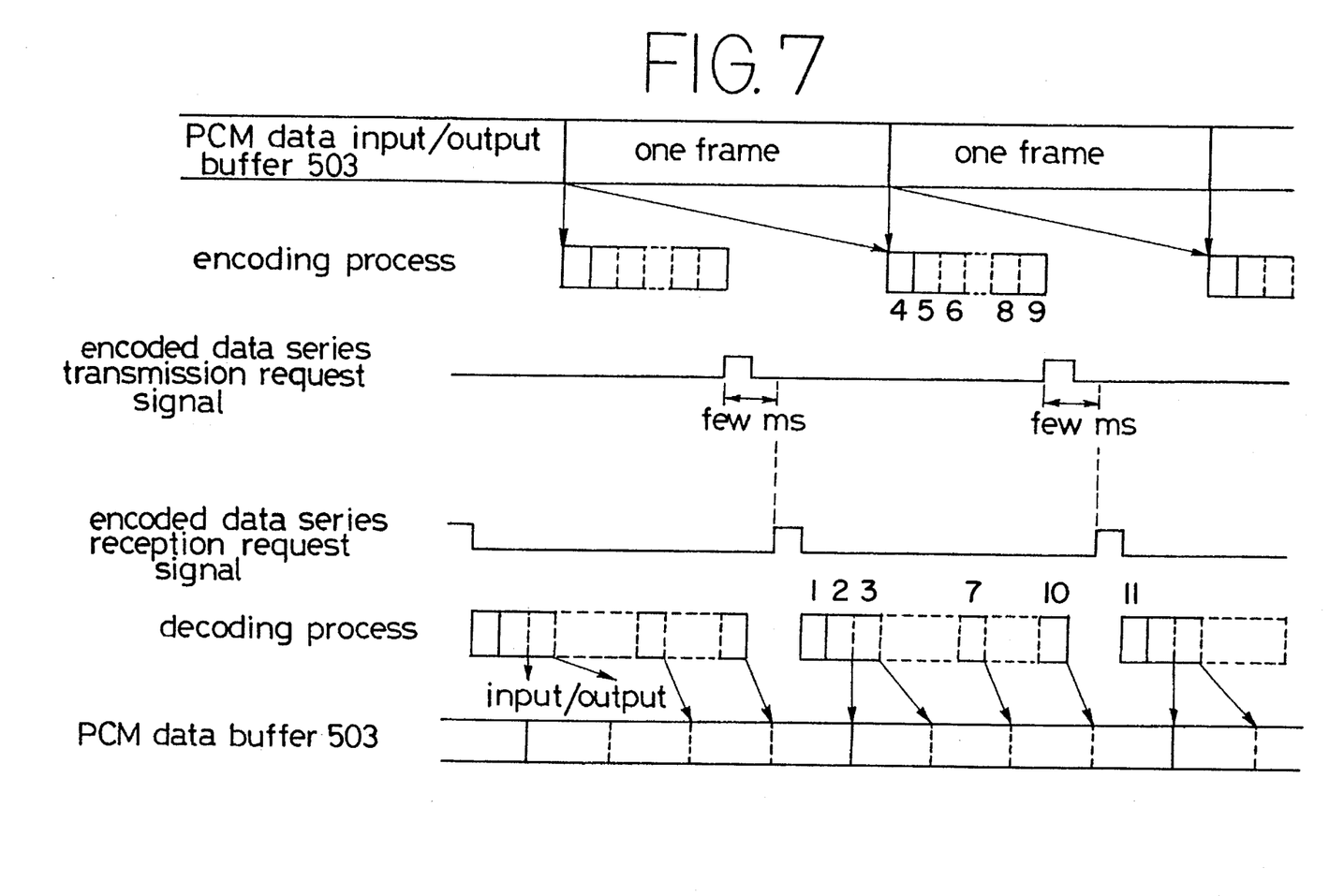
FIG. 7 is a timing chart of the processing sequence of the speech codec shown in FIG. 4.

FIG. 7 shows a processing timing sequence of the speech codec with one DSP chip according to the present invention. The processing sequence with the illustrated timing allows the PCM data input/output buffer 503 to have only six storage areas.

Figure 8:
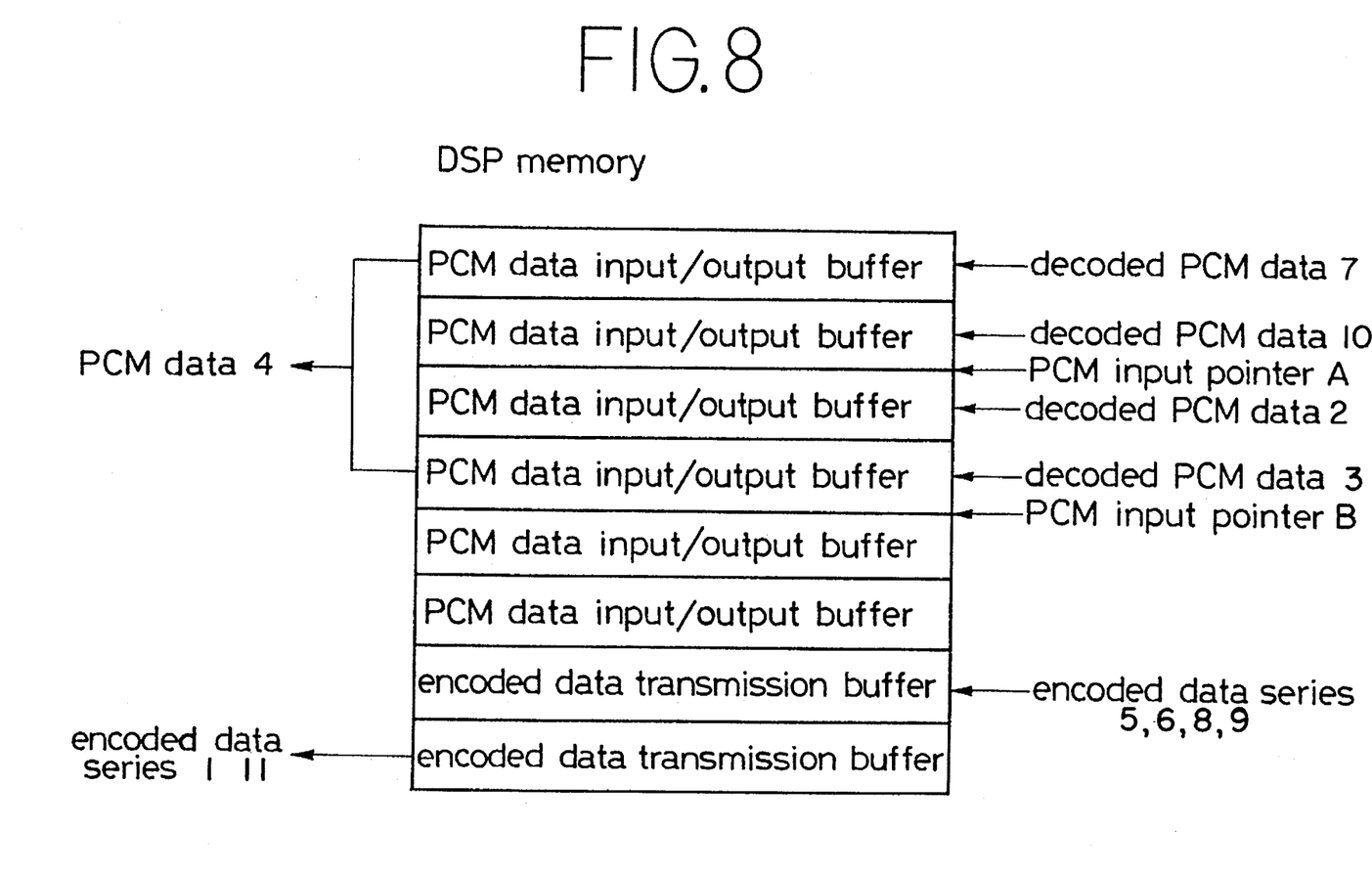
FIG. 8 is a diagram showing input/output of the DSP memory shown in FIG. 4.

The processing timing sequence shown in FIG. 7 will be described below. PCM input pointer positions A and B, shown in FIG. 8, are the beginning and ending positions A and B of the PCM input/output buffer in the processing operation of a single speech codec and are illustrated by way of example with respect to a certain processing time.

(1) One frame ① (FIG. 7) of encoded data received by the encoded data series reception buffer 512 is supplied to the frame decoding processor 513 and thereby subjected to the frame decoding process.

(2) The subframe decoding processor 514 effects its subframe decoding processing on the supplied data and outputs one subframe ② of decoded PCM data to the PCM data input/output buffer 503 as indicated by the PCM input pointer A.

(3) The subframe decoding processor 515 then effects its subframe decoding process on the supplied data and outputs one subframe ③ of decoded PCM data to the PCM data input/output buffer 503.

(4) One frame ④ of PCM data is supplied from the four subframe storage areas of the PCM data input/output buffer 503 to the frame encoding processor 504 which effects its frame encoding process on the supplied PCM data.

(5) The subframe encoding processor 505 effects its subframe encoding process on the data from the frame encoding processor 504 and outputs one subframe ⑤ of encoded data, which is to be transmitted out, to the encoded data series transmission buffer 509.

(6) The subframe encoding processor 506 effects its subframe encoding process on the data from the frame encoding processor 504 and outputs one subframe ⑥ of encoded data, which is to be transmitted out, to the encoded data series transmission buffer 509.

(7) The subframe decoding processor 516 then effects its subframe decoding process on the supplied data and outputs one subframe ⑦ of decoded PCM data to the PCM data input/output buffer 503.

(8) The subframe encoding processor 507 effects its subframe encoding process on the data from the frame encoding processor 504 and outputs one subframe ⑧ of encoded data, which is to be transmitted out, to the encoded data series transmission buffer 509.

(9) Thereafter, the subframe encoding processor 508 effects its subframe encoding process on the data from the frame encoding processor 504 and outputs one subframe ⑨ of encoded data, which is to be transmitted out, to the encoded data series transmission buffer 509.

(10) The subframe decoding processor 517 then effects its subframe decoding process on the supplied data and outputs one subframe ⑩ of decoded PCM data to the PCM data input/output buffer 503.

(11) Steps (1) through (10) are repeated. At this time, the PCM input pointer has moved from position A to position B (FIG. 8).

Since the speech codec according to the present invention is implemented by a single DSP chip rather than a plurality of separate DSP chips, it allows various devices incorporating the same, such as digital mobile communication units, to be reduced in size and weight. Furthermore, the DSP memory capacity of the PCM data input/output buffer may be 25% smaller than the DSP memory capacity of the conventional speech codec with two DSP chips because the PCM data input/output buffer in the speech codec according to the present invention has six storage areas whereas the PCM data input/output buffers in the conventional speech codec have a total of eight storage areas.

While a preferred embodiment of the present invention has been described using specific terms, such description is for the purpose of illustration only, and it is to be understood that changes and variations may be made without departing from the spirit or scope of the following claims.

What is claimed is:

1. A method of encoding and decoding speech signal data, comprising the steps of:

decoding one frame of received encoded speech signal data;

successively decoding two subframes of received speech signal data divided from the decoded frame of received encoded speech signal data;

encoding one frame of received speech signal data;

successively encoding two subframes of received speech signal data divided from the encoded frame of received speech signal data;

decoding one subframe of received speech signal data divided from the decoded frame of received encoded speech signal data;

encoding one subframe of received speech signal data divided from the encoded frame of received speech signal data;

encoding one subframe of received speech signal data divided from the encoded frame of received speech signal data, thus completing encoding of the subframes of received speech signal data contained in said one frame of received speech signal data; and decoding one subframe of received speech signal data divided from the decoded frame of received encoded speech signal data, thus completing decoding of the subframes of received encoded speech signal data contained in said one frame of received encoded speech signal data.

* * * * *